US010689303B2

(12) United States Patent
Weidmann et al.

(10) Patent No.: US 10,689,303 B2
(45) Date of Patent: Jun. 23, 2020

(54) ADDITIVE CONTAINING A SUPERPLASTICIZER AND A COPOLYMER

(71) Applicant: SIKA TECHNOLOGY AG, Baar (CH)

(72) Inventors: Jürg Weidmann, Winterthur (CH); Lukas Frunz, Dietlikon (CH); Jörg Zimmermann, Winterthur (CH)

(73) Assignee: SIKA TECHNOLOGY AG, Baar (CH)

( * ) Notice: Subject to any disclaimer, the term of this patent is extended or adjusted under 35 U.S.C. 154(b) by 136 days.

(21) Appl. No.: 15/762,954

(22) PCT Filed: Sep. 22, 2016

(86) PCT No.: PCT/EP2016/072547
§ 371 (c)(1),
(2) Date: Jun. 26, 2018

(87) PCT Pub. No.: WO2017/050898
PCT Pub. Date: Mar. 30, 2017

(65) Prior Publication Data

US 2019/0233338 A1 Aug. 1, 2019

(30) Foreign Application Priority Data

Sep. 24, 2015 (EP) .................................... 15186763

(51) Int. Cl.
*C04B 28/02* (2006.01)
*C04B 40/00* (2006.01)
(Continued)

(52) U.S. Cl.
CPC ...... *C04B 40/0042* (2013.01); *C04B 24/2641* (2013.01); *C04B 24/2647* (2013.01);
(Continued)

(58) Field of Classification Search
CPC ............ C04B 40/0042; C04B 24/2641; C04B 24/2647; C04B 28/02; C04B 40/0039;
(Continued)

(56) References Cited

U.S. PATENT DOCUMENTS

2001/0012864 A1* 8/2001 Satoh .................... C08F 220/04
524/5

FOREIGN PATENT DOCUMENTS

EP 1061089 A1 12/2000
EP 1 110 981 A2 6/2001
(Continued)

OTHER PUBLICATIONS

Mar. 27, 2018 International Preliminary Report on Patentability issued in International Patent Application No. PCT/EP2016/072547.

(Continued)

*Primary Examiner* — William K Cheung
(74) *Attorney, Agent, or Firm* — Oliff PLC

(57) ABSTRACT

The present invention relates to admixtures, especially a dispersant for solid particles, in particular a dispersant for mineral binder compositions, comprising:

a) a superplasticizer and
b) a copolymer having a polymer backbone and side chains bonded thereto, comprising at least one ionizable monomer unit M1 and at least one side chain-bearing monomer unit M2, wherein the copolymer has a nonrandom distribution of the monomer units M1 and/or the monomer units M2 in a direction along the polymer backbone, and wherein the superplasticizer and the copolymer differ from a chemical and/or structural point of view.

20 Claims, 1 Drawing Sheet

(51) Int. Cl.

| | |
|---|---|
| ***C04B 24/26*** | (2006.01) |
| *C04B 103/00* | (2006.01) |
| *C04B 103/40* | (2006.01) |
| *C04B 103/30* | (2006.01) |
| *C04B 103/32* | (2006.01) |

(52) U.S. Cl.

CPC .......... *C04B 28/02* (2013.01); *C04B 40/0039* (2013.01); *C04B 2103/0061* (2013.01); *C04B 2103/0063* (2013.01); *C04B 2103/308* (2013.01); *C04B 2103/32* (2013.01); *C04B 2103/408* (2013.01)

(58) Field of Classification Search

CPC .... C04B 2103/0061; C04B 2103/0063; C04B 2103/308; C04B 2103/32; C04B 2103/408

USPC ............................................................... 524/2

See application file for complete search history.

(56) References Cited

FOREIGN PATENT DOCUMENTS

| | | | |
|---|---|---|---|
| EP | 110 981 | A3 | 8/2001 |
| EP | 1 138 697 | A1 | 10/2001 |
| EP | 1 348 729 | A1 | 10/2003 |
| EP | 1 767 564 | A2 | 3/2007 |
| EP | 1 767 564 | A3 | 4/2007 |
| WO | 2010/130780 | A1 | 11/2010 |

OTHER PUBLICATIONS

Office Action issued in Thai Patent Application No. 1801001801.

Jun. 21, 2018 Colombian Office Action.

Dec. 15, 2016 Search Report issued in International Patent Application No. PCT/EP2016/072547.

Feb. 24, 2020 Office Action issued in Indonesian Patent Application No. P00201802905.

Feb. 18, 2020 Office Action issued in Brazillian Patent Application No. BR112018005717-7.

Feb. 27, 2020 Office Action issued in Columbian Patent Application No. 2018/0004250.

* cited by examiner

ADDITIVE CONTAINING A SUPERPLASTICIZER AND A COPOLYMER

This application is a national stage application under 35 U.S.C. § 371 of PCT Application No. PCT/EP2016/072547 having an international filing date of 22 Sep. 2016, which claims the benefit of European Patent Application No. 15186763.70 filed 24 Sep. 2015, the entire disclosure of each of which are hereby incorporated herein by reference.

TECHNICAL FIELD

The invention relates to an admixture, especially a dispersant for solid particles, in particular a dispersant for mineral binder compositions, comprising a superplasticizer and a copolymer. The invention further relates to the use of an admixture as dispersant for solid particles, to a mineral binder composition and to a shaped body obtainable therefrom.

PRIOR ART

Dispersants or superplasticizers are used in the building industry as plasticizers or water-reducing agents for mineral binder compositions, for example concrete, mortar, cements, gypsums and lime. The dispersants are generally organic polymers which are added to the makeup water or admixed with the binder compositions in solid form. In this way, it is advantageously possible to alter both the consistency of the binder composition during processing and the properties in the hardened state.

Known particularly effective dispersants are, for example, comb polymers based on polycarboxylate (PCE). Comb polymers of this kind have a polymer backbone and side chains bonded thereto. Corresponding polymers are described, for example, in EP 1 138 697 A1 (Sika AG).

Likewise known as concrete admixtures are copolymer mixtures as mentioned, for example, in EP 1 110 981 A2 (Kao). The copolymer mixtures are prepared by converting ethylenically unsaturated monomers in a free-radical polymerization reaction, wherein the molar ratio of the two monomers is altered at least once during the polymerization process.

In order to achieve an increase in the performance of the PCE polymers, these are nowadays used partly in the form of blends with further superplasticizers, for example lignosulfonates or melamine/naphthalene condensates. Known blends are indeed advantageous in some cases with regard to the plasticizing performance. However, they often have an unwanted effect on the setting characteristics of binder compositions. More particularly, known blends can disadvantageously prolong the setting time or result in premature cessation of the plasticizing effect.

This can be at least partly compensated for by combination with further admixtures, for example accelerators and/or retardants. However, such solutions are usually complicated in their application and costly.

There is therefore still a need for improved dispersants that do not have the disadvantages mentioned.

SUMMARY OF THE INVENTION

It is therefore an object of the invention to overcome the aforementioned disadvantages. More particularly, an improved dispersant, especially for solid particles and in particular for mineral binder compositions, is to be provided. The dispersant is in particular to enable effective plasticization and good processing of mineral binder compositions. In particular, the action of the dispersant is to be maintained for a maximum period of time. Moreover, what is desired is that the dispersant can be produced in a highly flexible and controlled manner.

It has been found that, surprisingly, this object can be achieved by the features of independent claim 1.

The core of the invention is accordingly an admixture, especially a dispersant for solid particles, in particular a dispersant for mineral binder compositions, comprising:

a) a superplasticizer and b) a copolymer having a polymer backbone and side chains bonded thereto, comprising at least one ionizable monomer unit M1 and at least one side chain-bearing monomer unit M2, wherein the copolymer has a nonrandom distribution of the monomer units M1 and/or the monomer units M2 in a direction along the polymer backbone.

Superplasticizer and copolymer differ here from a chemical and/or structural point of view.

As has been shown, admixtures of this kind, by comparison with known dispersants, give rise to very good plasticizing effects in mineral binder compositions which are additionally maintained for a comparatively long period. Especially by comparison with a superplasticizer alone or a copolymer alone, the inventive combinations in some cases show significantly better plasticizing performances. This shows that the superplasticizer and the copolymer interact functionally and synergistically. Moreover, the superplasticizers used in accordance with the invention and also the copolymers can be produced in a reliable manner in a wide variety of different modifications in efficient methods. The admixtures of the invention can, for example, be adapted to various requirements by blending the superplasticizers and the copolymers and can be produced in a flexible and controlled manner.

Further aspects of the invention are the subject of further independent claims. Particularly preferred embodiments of the invention are the subject of the dependent claims.

Ways of Executing the Invention

A first aspect of the present invention relates to an admixture, especially a dispersant for solid particles, in particular a dispersant for mineral binder compositions, comprising:

a) a superplasticizer and b) a copolymer having a polymer backbone and side chains bonded thereto, comprising at least one ionizable monomer unit M1 and at least one side chain-bearing monomer unit M2, wherein the copolymer has a nonrandom distribution of the monomer units M1 and/or the monomer units M2 in a direction along the polymer backbone.

Superplasticizer and copolymer differ here from a chemical and/or structural point of view. If the superplasticizer is a polymer, it especially has a random or statistical monomer distribution.

Superplasticizer

What is meant by the term "superplasticizer" in the present context is especially a substance which is capable of improving the flowability of mortar and/or cement compositions that have been made up with water and/or of reducing the water requirement of such compositions. Substances of this kind are also referred to as "plasticizers".

More particularly, the superplasticizer comprises at least one representative from the group consisting of lignosulfonates, gluconates, naphthalenesulfonates, sulfonated naphthalene-formaldehyde condensates, melamine sulfonates, vinyl copolymers, sulfonated vinyl copolymers, polycarboxylates, especially polycarboxylate ethers, or mixtures thereof.

More particularly, the superplasticizer is a polycarboxylate, especially a polycarboxylate ether. It is more preferably a comb polymer having a polycarboxylate backbone and polyether side chains, where the polyether side chains are bonded to the polycarboxylate backbone via ester, ether, amide and/or imide groups. More particularly, the polycarboxylate has a random or statistical monomer distribution.

More preferably, the superplasticizer is a polymer P having or consisting of the following substructure units:

a) a molar parts of a substructure unit S1 of the formula I (I)

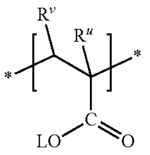

b) b molar parts of a substructure unit S2 of the formula II (II)

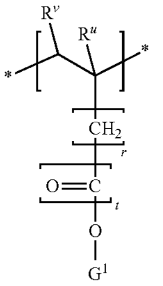

c) c molar parts of a substructure unit S3 of the formula (III)

(III)

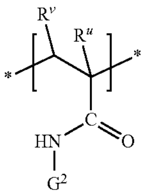

d) d molar parts of a substructure unit S4 of the formula (IV)

(IV)

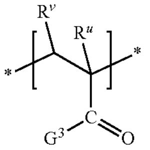

where

L independently represents $H^+$, an alkali metal ion, alkaline earth metal ion, a di- or trivalent metal ion, an ammonium ion or an organic ammonium group, each $R^u$ independently of the others is hydrogen or a methyl group, each $R^v$ independently of the others is hydrogen or COOM, r=0, 1 or 2, t=0 or 1, $G^1$ and $G^2$ is independently a $C_1$- to $C_{20}$-alkyl group, -cycloalkyl group, -alkylaryl group or is $-[A'O]_s-G^4$, where $A'=C_2$- to $C_4$-alkylene, $G^4$ is H, a $C_1$- to $C_{20}$-alkyl group, -cycloalkyl group or -alkylaryl group, and s=2-250, $G^3$ is independently $NH_2$, $—NG^5G^6$, $—OG^7NG^8G^9$, where $G^5$ and $G^6$ are independently a $C_1$- to $C_{20}$-alkyl group, -cycloalkyl group, -alkylaryl group or -aryl group, or are a hydroxyalkyl group or are an acetoxyethyl group ($CH_3—CO—O—CH_2—CH_2—$) or a hydroxyisopropyl group ($HO—CH(CH_3)—CH_2—$) or an acetoxyisopropyl group ($CH_3—CO—O—CH(CH_3)—CH_2—$);

or $G^5$ and $G^6$ together form a ring of which the nitrogen is part, in order to construct a morpholine or imidazoline ring;

$G^7$ is a $C_2$-$C_4$-alkylene group, $G^8$ and $G^9$ each independently represent a $C_1$- to $C_{20}$-alkyl group, -cycloalkyl group, -alkylaryl group, -aryl group or a hydroxyalkyl group, and where a, b, c and d represent molar proportions of the respective substructure units S1, S2, S3 and S4, with a/b/c/d=(0.1-0.9)/(0.1-0.9)/(0-0.8)/(0-0.8), especially a/b/c/d=(0.3-0.9)/(0.1-0.7)/(0-0.6)/(0-0.4), preferably a/b/c/d=(0.5-0.8)/(0.2-0.4)/(0.001-0.005)/0 and with the proviso that a+b+c+d=1.

The sequence of the substructure units S1, S2, S3 and S4 may be alternating, blockwise or random. It is also possible that the one or more substructure units S1, S2, S3 and S4 form a gradient structure. In principle, it is also possible that further structural units are present in addition to the substructure units S1, S2, S3 and S4. In particular, the sequences of the substructure units S1, S2, S3 and S4 in the polymer P are random or statistical.

Preferably, the substructure units S1, S2, S3, and S4 together have a proportion by weight of at least 50% by weight, especially at least 90% by weight, most preferably at least 95% by weight, of the total weight of the polymer P.

The preparation of polymers P is known per se to the person skilled in the art and can be effected, for example, by free-radical polymerization of the corresponding monomers of the formula ($I_m$), ($II_m$), ($III_m$) and/or ($IV_m$), which leads to a polymer P having the substructure units S1, S2, S3 and S4. The $R^u$, $R^v$, $G^1$, $G^2$, $G^3$, L, r and t radicals are defined here as described above in connection with the polymer P.

($I_m$)

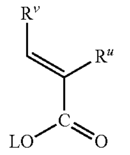

-continued (II$_m$)

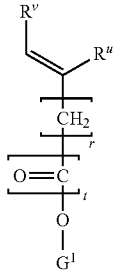

(III$_m$)

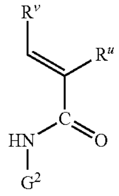

(IV$_m$)

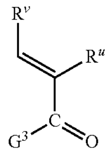

It is likewise possible to prepare the polymers P by polymer-analogous reaction of a polycarboxylic acid of the formula (V).

(V)

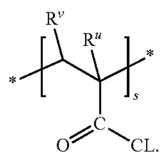

In the polymer-analogous reaction, the polycarboxylic acid of the formula (V) is esterified or amidated with the corresponding alcohols or amines (e.g. HO-$G^1$, $H_2N$-$G^2$, H-$G^3$) and then at most neutralized or partly neutralized (according to the nature of the L radical, for example, with metal hydroxides or ammonia). The L radicals and the parameter s are defined here as described above in connection with the polymer P. Details of the polymer-analogous reaction are disclosed, for example, in EP 1 138 697 B1 at page 7 line 20 to page 8 line 50, and in the examples thereof, or in EP 1 061 089 B1 at page 4, line 54 to page 5 line 38 and in the examples thereof. In a variation thereof as described in EP 1 348 729 A1 at page 3 to page 5 and in the examples thereof, the polymer can be prepared in the solid state of matter. The disclosure of these patent specifications cited is hereby more particularly incorporated by reference. Preparation by polymer-analogous reaction is preferred.

In the polymer P, $R^v$ especially represents hydrogen and $R^u$ is preferably hydrogen and/or a methyl group.

Preferably, in the polymer P, r=0 and t=1. Also advantageously, r=1-2 and t=0.

More particularly, in the polymer P, $R^v$ is hydrogen, $R^u$ is a methyl group, r=1-2 and t=0.

$G^1$ and/or $G^2$ in the polymer P, in each case independently, are advantageously -[A'O]$_s$-$G^4$ with s=8-200, especially 20-70, and A' is a $C_2$- to $C_4$-alkylene.

In the polymer P, $G^4$, in each case independently, is preferably hydrogen or a methyl group.

Very particularly advantageous polymers P are those where a) the $R^u$ and $R^v$ radicals are hydrogen,
b) r=0,
c) t=1,
d) $G^1$ and $G^2$, in each case independently, are -[A'O]$_s$-$G^4$ with s=20-70 and A'=$C_2$-alkylene,
e) $G^4$ represents a methyl group and/or
f) a/b/c/d=(0.5-0.8)/(0.2-0.4)/(0.001-0.005)/0

Likewise advantageous polymers P are those where a) t=0 and r=1-2,
b) $G^1$, in each case independently, is -[A'O]$_s$-$G^4$ with s=8-200, especially 20-70,
c) $G^4$ represents hydrogen or a methyl group, especially hydrogen,
d) and/or A' is a $C_2$- to $C_4$-alkylene, especially a $C_2$-alkylene.

A weight-average molecular weight ($M_W$) of the polymer P is particularly 5'000-150'000 g/mol, preferably 10'000-100'000 g/mol, especially 20'000-90'000 g/mol. The weight-average molecular weight ($M_W$) is determined by gel permeation chromatography (GPC), using polyethylene glycol (PEG) as standard.

Corresponding superplasticizers or polymers P are also commercially supplied by Sika Schweiz AG under the ViscoCrete® trade name series.

The superplasticizer or the polymer P is advantageously used in the liquid state of matter. This can achieve better distribution and wetting of the solid particles. For example, the superplasticizer or the polymer P the composition may be in the form of a solution or dispersion. Especially of an aqueous solution or dispersion.

In principle, however, it is also possible to use the superplasticizer or the polymer P as a melt or in the solid state of matter, for example in the form of powder, pellets or flakes.

Copolymer

The terms "ionizable monomers" and "ionizable monomer units" especially mean monomers or polymerized monomers that are in anionic or negatively charged form at a pH>10, especially at a pH>12. These are especially H donor groups or acid groups. The ionizable groups are more preferably acid groups, for example carboxylic acid, sulfonic acid, phosphoric acid and/or phosphonic acid groups. Preference is given to carboxylic acid groups. The acid groups may also take the form of anions in deprotonated form or of a salt with a counterion or cation.

A "nonrandom distribution" is understood in the present case to mean a nonstatistical distribution of the monomer units M1 and/or the monomer units M2. This means that the ionizable monomer units M1 and/or the side chain-bearing monomer units M2 are arranged in the copolymer, for example, in an alternating or block-type manner and/or in a gradient structure.

The structure of the copolymers can be analyzed and determined, for example, by nuclear spin resonance spectroscopy (NMR spectroscopy). By $^{13}C$ and $^1H$ NMR spectroscopy in particular, it is possible in a manner known per se to determine the sequence of the monomer units in the copolymer on the basis of neighboring group effects in the copolymer and using statistical evaluations.

The ionizable monomer units M1 preferably include acid groups, especially carboxylic acid, sulfonic acid, phosphoric acid and/or phosphonic acid groups.

The side chain-bearing monomer unit M2 especially includes polyalkylene oxide side chains, especially polyethylene oxide and/or polypropylene oxide side chains.

More particularly, the ionizable monomer units M1 have a structure of the formula VI:

(VI)

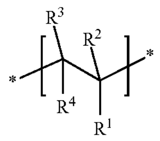

The side chain-bearing monomer units M2 preferably have a structure of the formula VII:

(VII)

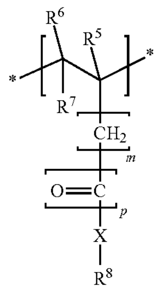

where $R^1$, in each case independently, is —COOM, —$SO_2$—OM,

—O—$PO(OM)_2$ and/or —$PO(OM)_2$, $R^2$, $R^3$, $R^5$ and $R^6$, in each case independently, are H or an alkyl group having 1 to 5 carbon atoms, $R^4$ and $R^7$, in each case independently, are H, —COOM or an alkyl group having 1 to 5 carbon atoms, or where $R^1$ forms a ring together with $R^4$ to give —CO—O—CO—, M, independently of one another, represents $H^+$, an alkali metal ion, an alkaline earth metal ion, a di- or trivalent metal ion, an ammonium ion or an organic ammonium group;

m=0, 1 or 2, p=0 or 1,

X, in each case independently, is —O— or —NH—, $R^8$ is a group of the formula $-[AO]_n—R^a$ where A=$C_2$- to $C_4$-alkylene, $R^a$ is H, a $C_1$- to $C_{20}$-alkyl group, -cycloalkyl group or -alkylaryl group, and n=2-250, especially 10-200.

A molar ratio of the monomer units M1 to the monomer units M2 is advantageously in the range of 0.5-6, especially 0.7-4, preferably 0.9-3.8, further preferably 1.0-3.7 or 2-3.5.

More particularly, $R^1$=COOM, $R^2$=H or $CH_3$, $R^3$=$R^4$=H. It is thus possible to prepare the copolymer on the basis of acrylic or methacrylic acid monomers, which is of interest from an economic point of view. Moreover, copolymers of this kind in the present context result in a particularly good dispersing effect.

Likewise advantageously, $R^1$=COOM, $R^2$=H, $R^3$=H and $R^4$=COOM. Corresponding copolymers can be prepared on the basis of maleic acid monomers.

The X group in the ionizable monomer units M2, advantageously in at least 75 mol %, particularly in at least 90 mol %, especially in at least 95 mol % or at least 99 mol % of all monomer units M2, is —O— (=oxygen atom).

Advantageously, $R^5$=H or $CH_3$, $R^6$=$R^7$=H and X=—O—. It is thus possible to prepare the copolymers, for example, proceeding from (meth)acrylic esters, vinyl ethers, (meth)allyl ethers or isoprenol ethers.

In a particularly advantageous embodiment, $R^2$ and $R^5$ are each mixtures of 40-60 mol % of H and 40-60 mol % of —$CH_3$.

In a further advantageous embodiment, $R^1$=COOM, $R^2$=H, $R^5$=—$CH_3$ and $R^3$=$R^4$=$R^6$=$R^7$=H.

In another advantageous embodiment, $R^1$=COOM, $R^2$=$R^5$=H or —$CH_3$ and $R^3$=$R^4$=$R^6$=$R^7$=H.

Especially suitable copolymers are those in which $R^1$=COOM; $R^2$ and $R^5$ are each independently H, —$CH_3$ or mixtures thereof; $R^3$ and $R^6$ are each independently H or —$CH_3$, preferably H; $R^4$ and $R^7$ are each independently H or —COOM, preferably H.

The $R^8$ radical in the side chain-bearing monomer units M2, based on all the $R^8$ radicals in the monomer units, consists of a polyethylene oxide especially to an extent of at least 50 mol %, especially at least 75 mol %, preferably at least 95 mol % or at least 99 mol %.

A proportion of ethylene oxide units based on all the alkylene oxide units in the copolymer is especially more than 75 mol %, especially more than 90 mol %, preferably more than 95 mol % and specifically 100 mol %.

More particularly, $R^8$ has essentially no hydrophobic groups, especially no alkylene oxides having three or more carbon atoms. This especially means that a proportion of alkylene oxides having three or more carbon atoms based on all the alkylene oxides is less than 5 mol %, especially less than 2 mol %, preferably less than 1 mol % or less than 0.1 mol %. In particular, there are no alkylene oxides having three or more carbon atoms or the proportion thereof is 0 mol %.

$R^a$ is advantageously H and/or a methyl group. Particularly advantageously, A=$C_2$-alkylene and $R^a$ is H or a methyl group.

More particularly, the parameter n=10-150, especially n=15-100, preferably n=17-70, specifically n=19-45 or n=20-25. In particular, this achieves excellent dispersing effects within the preferred ranges specified.

Particular preference is given to copolymers in which $R^1$=COOM; $R^2$ and $R^5$, independently of one another, are H, —$CH_3$ or mixtures thereof; $R^3$ and $R^6$, independently of one another, are H or —$CH_3$, preferably H; $R^4$ and $R^7$, independently of one another, are H or —COOM, preferably H; and where X in at least 75 mol %, particularly in at least 90 mol %, especially in at least 99 mol %, of all monomer units M2 is —O—.

It may further be advantageous when the copolymer comprises at least one further monomer unit MS which especially differs chemically from the monomer units M1 and M2. In particular, multiple different further monomer units MS may be present. In this way, it is possible to further modify the properties of the copolymer and to adjust them, for example, with regard to specific applications.

Particularly advantageously, the at least one further monomer unit MS is a monomer unit of the formula VIII:

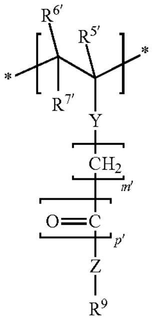

(VIII)

where $R^{5'}$, $R^{6'}$, $R^{7'}$, m' and p' are the same as defined for $R^5$, $R^6$, $R^7$, m and p as described above in the context of the copolymer;

Y, in each case independently, is a chemical bond or —O—;

Z, in each case independently, is a chemical bond, —O— or —NH—;

$R^9$, in each case independently, is an alkyl group, cycloalkyl group, alkylaryl group, aryl group, hydroxyalkyl group or acetoxyalkyl group, each having 1-20 carbon atoms.

Advantageous examples of further monomer units MS are those where m'=0, p'=0, Z and Y represent a chemical bond and $R^9$ is an alkylaryl group having 6-10 carbon atoms.

Also suitable are especially further monomer units MS in which m'=0, p'=1, Y is —O—, Z represents a chemical bond and $R^9$ is an alkyl group having 1-4 carbon atoms.

Further suitable are further monomer units MS where m'=0, p'=1, Y is a chemical bond, Z is —O— and $R^9$ is an alkyl group and/or a hydroxyalkyl group having 1-6 carbon atoms.

Particularly advantageously, the at least one further monomer unit MS consists of polymerized vinyl acetate, styrene and/or hydroxyalkyl (meth)acrylate, especially hydroxyethyl acrylate.

In particular, the polydispersity (=weight-average molecular weight $M_W$/number-average molecular weight $M_n$) of the copolymer is <1.5, particularly in the range of 1.0-1.4, especially 1.1-1.3.

A weight-average molecular weight $M_W$ of the overall copolymer is especially in the range of 10'000-150'000 g/mol, advantageously 12'000-80'000 g/mol, especially 12'000-50'000 g/mol. In the present context, molecular weights such as the weight-average molecular weight $M_W$ or the number-average molecular weight $M_n$ are determined by gel permeation chromatography (GPC) with polyethylene glycol (PEG) as standard. This technique is known per se to those skilled in the art.

The copolymer is particularly a polymer having essentially linear structure. This particularly means that all monomer units of the copolymer are arranged in a single and/or unbranched polymer chain. Specifically, the copolymer does not have a star-shaped structure and/or the copolymer is not part of a branched polymer. More particularly, the copolymer is not part of a polymer in which there are multiple, especially three or more, polymer chains running in different directions attached to a central molecule.

Copolymers with Gradient Structure

In a preferred embodiment, the copolymer has a gradient structure in at least one section AA in a direction along the polymer backbone with respect to the ionizable monomer unit M1 and/or with respect to the side chain-bearing monomer unit M2.

In other words, in the copolymer of the invention, there is a concentration gradient in at least one section AA in a direction along the polymer backbone with regard to the ionizable monomer unit M1 and/or with regard to the side chain-bearing monomer unit M2.

The term “gradient structure” or “concentration gradient” in the present case is especially a continuous change in the local concentration of a monomer unit in at least one section in a direction along the copolymer backbone. Another term for “concentration gradient” is “concentration slope”.

The concentration gradient may, for example, be essentially constant. This corresponds to a linear decrease or increase in the local concentration of the respective monomer unit in the at least one section AA in the direction of the copolymer backbone. However, it is also possible that the concentration gradient changes in the direction of the copolymer backbone. In this case, there is a nonlinear decrease or increase in the local concentration of the respective monomer unit. The concentration gradient extends especially over at least 10, especially at least 14, preferably at least 20 or at least 40, monomer units of the copolymer.

By contrast, abrupt or sharp changes in concentration of monomers as occur, for example, in the case of block copolymers are not referred to as a concentration gradient.

The expression “local concentration” in the present context refers to the concentration of a particular monomer at a given point in the polymer backbone. In practice, the local concentration or the mean of the local concentration can be ascertained, for example, by determining the monomer conversions during the preparation of the copolymer. In this case, the monomers converted within a particular period can be ascertained. The averaged local concentration especially corresponds to the ratio of the mole fraction of a particular monomer converted within the period of time in question to the total molar amount of the monomers converted within the period of time in question.

The conversions of the monomers can be determined in a manner known per se, for example, with the aid of liquid chromatography, especially high-performance liquid chromatography (HPLC), and taking account of the amounts of monomers used. The structure of the copolymers can also be determined as set out above by $^{13}C$ and $^{1}H$ NMR spectroscopy.

The copolymer may also have more than one section AA having a gradient structure, especially two, three, four or even more sections AA, which are arranged in succession, for example. If present, different gradient structures or concentration slopes may each be present in the different sections AA.

Preferably, in the at least one section AA, a local concentration of the at least one ionizable monomer unit M1 increases continuously along the polymer backbone, while a local concentration of the at least one side chain-bearing monomer unit M2 decreases continuously along the polymer backbone, or vice versa.

A local concentration of the ionizable monomer unit M1 at the first end of the at least one section AA is especially lower than at the second end of the section AA, while a local concentration of the side chain-bearing monomer unit M2 at the first end of the section AA is greater than at the second end of the section AA, or vice versa.

More particularly, in the case of a division of the at least one section AA into 10 subsections of equal length, the averaged local concentration of the at least one ionizable monomer unit M1 in the respective subsections along the polymer backbone increases in at least 3, especially in at least 5 or 8, successive subsections, while the averaged local concentration of the at least one side chain-bearing monomer unit M2 in the respective subsections along the polymer backbone decreases in at least 3, especially in at least 5 or 8, successive subsections, or vice versa.

Specifically, an increase or decrease in the averaged local concentration of the at least one ionizable monomer unit M1 in the successive subsections is essentially constant, while, advantageously, a decrease or increase in the averaged local concentration of the at least one side chain-bearing monomer unit M2 in the successive subsections is essentially likewise constant.

In an advantageous embodiment, the at least one section AA having the gradient structure, based on a total length of the polymer backbone, has a length of at least 30%, especially at least 50%, preferably at least 75% or 90%.

Advantageously, the at least one section AA, based on a total number of monomer units in the polymer backbone, has a proportion of at least 30%, especially at least 50%, preferably at least 75% or 90%, of monomer units.

In particular, the at least one section AA, based on the weight-average molecular weight of the overall copolymer, has a proportion by weight of at least 30%, especially at least 50%, preferably at least 75% or 90%.

Thus, the section AA with the concentration gradient or the gradient structure is of particular importance.

The at least one section AA having the concentration gradient advantageously comprises 5-70, especially 7-40, preferably 10-25, monomer units M1 and 5-70, especially 7-40, preferably 10-25, monomer units M2.

More particularly, the copolymer consists to an extent of at least 50 mol %, in particular at least 75 mol %, especially at least 90 mol % or 95 mol %, of ionizable monomer units M1 and side chain-bearing monomer units M2.

It is advantageous when at least 30 mol %, especially at least 50 mol %, preferably at least 75 mol %, in particular at least 90 mol % or at least 95 mol %, of the ionizable monomer units M1 are in the at least one section AA having a gradient structure.

Likewise advantageously, at least 30 mol %, especially at least 50 mol %, preferably at least 75 mol %, in particular at least 90 mol % or at least 95 mol %, of the side chain-bearing monomer units M2 are in the at least one section having a gradient structure.

Especially preferably, the two latter aforementioned conditions apply simultaneously.

In another advantageous embodiment, the copolymer, in addition to the at least one section AA having a gradient structure, has a further section AB, wherein there is essentially a constant local concentration of the monomers and/or a statistical or random distribution of the monomers over the entire section AB. Section AB may consist, for example, of a single kind of monomers or of multiple different monomers in random distribution. In section AB, however, there is especially no gradient structure and no concentration gradient along the polymer backbone.

The copolymer may also have more than one further section AB, for example two, three, four or even more sections AB, which may differ from one another from a chemical and/or structural point of view.

Preferably, the at least one section AA directly adjoins the further section AB.

It has been found that, surprisingly, copolymers of this kind are even more advantageous under some circumstances with regard to the plasticizing effect and the maintenance thereof over time.

More particularly, the further section AB comprises ionizable monomer units M1 and/or side chain-bearing monomer units M2.

Based on all the monomer units present therein, the further section AB, in one embodiment of the invention, for example, comprises advantageously at least 30 mol %, especially at least 50 mol %, preferably at least 75 mol %, in particular at least 90 mol % or at least 95 mol %, of ionizable monomer units M1. Any proportion of side chain-bearing monomer units M2 present in the further section AB is particularly less than 25 mol %, especially less than 10 mol % or less than 5 mol %, based on all monomer units M1 in the further section. More particularly, there are no side chain-bearing monomer units M2 in the further section AB.

In a further and particularly advantageous implementation of the invention, the further section AB, based on all the monomer units present therein, comprises at least 30 mol %, especially at least 50 mol %, preferably at least 75 mol %, in particular at least 90 mol % or at least 95 mol %, of side chain-bearing monomer units M2. In this case, any proportion of ionizable monomer units M1 present in the further section AB is in particular less than 25 mol %, especially less than 10 mol % or less than 5 mol %, based on all monomer units M2 in the further section AB. More particularly, there are no ionizable monomer units M1 in the further section AB.

It has been found to be appropriate when the further section AB comprises a total of 5-70, especially 7-40, preferably 10-25, monomer units. These are especially ionizable monomer units M1 and/or side chain-bearing monomer units M2.

A ratio of the number of monomer units in the at least one section AA having gradient structure to the number of monomer units in the at least one further section AB having the essentially constant local concentration is advantageously in the range of 99:1-1:99, especially 10:90-90:10, preferably 80:20-20:80, especially 70:30-30:70.

If present, the at least one further monomer unit MS may be part of the at least one section AA and/or of the further section AB. It is also possible that the at least one further monomer unit MS is part of an additional section of the copolymer. More particularly, different further monomer units MS may be present in the different sections.

If present in the at least one section AA, the at least one further monomer unit MS advantageously has a proportion in the at least one section AA of 0.001-80 mol %, preferably 20-75 mol %, especially 30-70 mol %, based on all the monomer units in the first section AA.

If present in the further section AB, the at least one further monomer unit MS especially has a proportion in the further section AB of 0.001-80 mol %, preferably 20-75 mol %, especially 30-70 mol % or 50-70 mol %, based on all the monomer units in the further section AB.

In an advantageous embodiment, the at least one further monomer unit MS is present in the at least one section AA and/or in the further section AB with a proportion of 20-75 mol %, especially 30-70 mol %, based on all monomer units in the respective section.

In a further advantageous embodiment, the copolymer consists of the at least one section AA. In another advantageous embodiment, the copolymer consists of the at least one section AA and the further section AB. The latter case in particular results in very good and long-lasting plasticizing effects.

However, it is also possible, for example, that the copolymer contains at least two different sections AA and/or at least two different further sections AB.

A particularly advantageous copolymer has at least one or more than one of the following features:

i) The copolymer consists to an extent of at least 75 mol %, especially at least 90 mol % or 95 mol %, of ionizable monomer units M1 and side chain-bearing monomer units M2;
ii) The copolymer comprises or consists of at least one section AA and a further section AB;
iii) The further section AB comprises side chain-bearing monomer units M2, especially at least 50 mol %, preferably at least 75 mol %, in particular at least 90 mol % or at least 95 mol %, based on all the monomer units present in the section AB. Any proportion of ionizable monomer units M1 present in the further section AB is less than 25 mol %, especially less than 10 mol % or less than 5 mol %, based on all monomer units M2 in the further section AB.
iv) A molar ratio of the monomer units M1 to the monomer units M2 in the copolymer is in the range of 0.5-6, preferably 0.8-3.5;
v) $R^1$ is COOM;
vi) $R^2$ and $R^5$ are H or $CH_3$, preferably $CH_3$;
vii) $R^3$=$R^4$=$R^6$=$R^7$=H;
viii) m=0 and p=1;
ix) X=—O—
x) A=$C_2$-alkylene and n=10-150, preferably 15-50;
xi) $R^a$=H or —$CH_3$, preferably $CH_3$.

Especially preferred is a copolymer consisting of sections AA and AB which has at least all the features (i)-(iv). Further preferred is a copolymer having all the features (i)-(xi). Even further preferred is a copolymer which fulfills all the features (i)-(xi) in the executions preferred in each case.

Copolymer with Block Structure

Likewise advantageous is a copolymer comprising at least one first block A and at least one second block B, wherein the first block A has an ionizable monomer unit M1 of the formula VI and the second block B has a side chain-bearing monomer unit M2 of the formula VII.

More particularly, any proportion of monomer units M2 present in the first block A is less than 25 mol %, especially not more than 10 mol %, based on all the monomer units M1 in the first block A, and any proportion of monomer units M1 present in the second block B is less than 25 mol %, especially not more than 10 mol %, based on all the monomer units M2 in the second block B.

Multiple different monomer units M1 of the formula VI and/or multiple different monomer units M2 of the formula VII may be present in the block copolymer of the invention.

The monomer units M1 and any further monomer units in the first block A are especially in statistical or random distribution. The monomer units M2 and any further monomer units in the second block B are likewise especially in statistical or random distribution.

In other words, the at least one block A and/or the at least one block B preferably each take the form of a component polymer with random monomer distribution.

The at least one first block A advantageously comprises 5-70, especially 7-40, preferably 10-25, monomer units M1 and/or the at least one second block B comprises 5-70, especially 7-50, preferably 20-40, monomer units M2.

Preferably, any proportion of monomer units M2 present in the first block A is less than 15 mol %, particularly less than 10 mol %, especially less than 5 mol % or less than 1 mol %, based on all monomer units M1 in the first block A. In addition, any proportion of monomer units M1 present in the second block B is advantageously less than 15 mol %, particularly less than 10 mol %, especially less than 5 mol % or less than 1 mol %, based on all monomer units M2 in the second block B. Advantageously, both conditions are fulfilled at the same time.

Especially advantageously, for example, any proportion of monomer units M2 present in the first block A is less than 15 mol % (based on all the monomer units M1 in the first block A) and any proportion of monomer units M1 present in the second block B is less than 10 mol % (based on all the monomer units M2 in the second block B).

Thus, the monomer units M1 and M2 are essentially spatially separate, which is to the benefit of the dispersing effect of the block copolymer and is advantageous with regard to the retardation problem.

The first block A, based on all the monomer units in the first block A, consists in particular to an extent of at least 20 mol %, particularly at least 50 mol %, especially at least 75 mol % or at least 90 mol %, of ionizable monomer units M1 of the formula VI. The second block B, based on all the monomer units in the second block B, consists advantageously to an extent of at least 20 mol %, particularly at least 50 mol %, especially at least 75 mol % or at least 90 mol %, of side chain-bearing monomer units M2 of the formula VII.

A molar ratio of the monomer units M1 to the monomer units M2 in the block copolymer is especially in the range of 0.5-6, especially 0.7-4, preferably 0.9-3.8, further preferably 1.0-3.7 or 2-3.5. This achieves an optimal dispersing effect in mineral binder compositions.

It may further be advantageous when the copolymer with block structure comprises at least one further monomer unit MS as described above. In particular, multiple different further monomer units MS may be present. In this way, it is possible to further modify the properties of the copolymer and to adjust them, for example, with regard to specific applications.

The at least one further monomer unit MS may be part of the first block A and/or of the second block B. It is also possible that the at least one further monomer unit MS is part of an additional block of the copolymer. More particularly, different monomer units MS may be present in the different blocks.

If present in the first block A, the at least one further monomer unit MS advantageously has a proportion in the first block A of 0.001-80 mol %, preferably 20-75 mol %, especially 30-70 mol %, based on all the monomer units in the first block A.

If present in the second block B, the at least one further monomer unit MS especially has a proportion in the second block B of 0.001-80 mol %, preferably 20-75 mol %, especially 30-70 mol % or 50-70 mol %, based on all the monomer units in the second block B.

In an advantageous embodiment, the at least one further monomer unit MS is present in the first block A and/or in the second block B with a proportion of 20-75 mol %, especially 30-70 mol %, based on all monomer units in the respective block.

In a further advantageous embodiment, there is at least one further block C arranged between the first block A and the second block B, which differs chemically and/or structurally from the first and second blocks.

Advantageously, the at least one further block C comprises or consists of monomer units MS as described above. However, it is also possible for further monomer units to be present in addition to or in place of the monomer units MS.

More particularly, the at least one further block C consists to an extent of at least 50 mol %, especially at least 75 mol %, preferably at least 90 mol % or at least 95 mol %, of monomer units MS as described above.

In a particularly advantageous embodiment, the copolymer of the invention is a diblock copolymer consisting of a block A and a block B.

Likewise suitable are block copolymers containing at least two blocks of the first block A and/or at least two blocks of the second block B. More particularly, these are block copolymers containing two instances of the first block A and one instance of the second block B, or block copolymers containing one instance of the first block A and two instances of the second block B. Block copolymers of this kind especially take the form of triblock copolymers, tetrablock copolymers or pentablock copolymers, preferably triblock copolymers. There are one or two further blocks present in the tetrablock copolymers and the pentablock copolymers, for example blocks of the C block type as described above.

A particularly advantageous block copolymer has at least one or more than one of the following features:

i) Block A has 7-40, especially 10-25, monomer units M1 and block B has 7-50, especially 20-40, monomer units M2.

ii) The first block A, based on all the monomer units in the first block A, consists to an extent of at least 75 mol %, preferably at least 90 mol %, of ionizable monomer unit M1;

iii) The second block B, based on all the monomer units in the second block B, consists to an extent of at least 75 mol %, preferably at least 90 mol %, of side chain-bearing monomer units M2;

iv) A molar ratio of the monomer units M1 to the monomer units M2 in the block copolymer is in the range of 0.5-6, preferably 0.8-3.5;

v) $R^1$ is COOM;

vi) $R^2$ and $R^5$ are H or $CH_3$, preferably $CH_3$;

vii) $R^3$=$R^4$=$R^6$=$R^7$=H;

viii) m=0 and p=1;

ix) X=—O— x) A=$C_2$-alkylene and n=10-150, preferably 15-50;

xi) $R^a$=H or —$CH_3$, preferably $CH_3$.

Especially preferred is a diblock copolymer consisting of blocks A and B which has at least all the features (i)-(iv). Further preferred is a diblock copolymer having all the features (i)-(xi). Even further preferred is a diblock copolymer which fulfills all the features (i)-(xi) in the executions preferred in each case.

Likewise advantageous is a triblock copolymer consisting of the blocks A, B and C, especially in the sequence A-C-B, where the triblock copolymer has at least all the features (i)-(iv). Further preferred is a triblock copolymer having all the features (i)-(xi). Even further preferred is a triblock copolymer which fulfills all the features (i)-(xi) in the executions preferred in each case. Block C advantageously comprises monomer units MS as described above, or block C consists thereof.

In a specific embodiment, these diblock copolymers or triblock copolymers also include, in block A and B, additionally a further monomer unit MS as described above, especially a further monomer unit MS of the formula VIII.

Preparation of Copolymers

A further aspect of the present invention relates to a process for preparing a copolymer, especially a copolymer as described above, wherein ionizable monomers m1 and side chain-bearing monomers m2 are polymerized together to form a nonrandom distribution of the ionizable monomers m1 and/or the side chain-bearing monomers m2.

The ionizable monomers m1, on completion of polymerization, correspond to the abovementioned ionizable monomer units M1 of the copolymer. The side chain-bearing monomers m2, on completion of polymerization, likewise correspond to the above-described side chain-bearing monomer units M2.

The side chain-bearing monomers m2 especially include polyalkylene oxide side chains, preferably polyethylene oxide and/or polypropylene oxide side chains.

The ionizable monomers m1 preferably include acid groups, especially carboxylic acid, sulfonic acid, phosphoric acid and/or phosphonic acid groups.

More particularly, the ionizable monomers m1 have a structure of the formula IX:

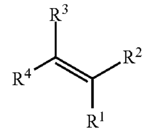

(IX)

The side chain-bearing monomers m2 preferably have a structure of the formula X:

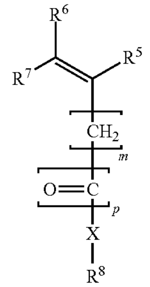

(X)

where the $R^1$-$R^8$, X groups and the parameters m and p are defined as described above in connection with the copolymer.

In a further advantageous embodiment, there is at least one further monomer ms present during the polymerization, which is polymerized, and this is especially a monomer of the formula XI:

(XI)

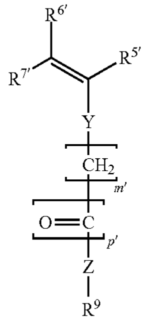

where $R^{5'}$, $R^{6'}$, $R^{7'}$, $R^9$, Y, Z, m' and p' are defined as above.

The copolymer is especially prepared by a living free-radical polymerization.

A free-radical polymerization can basically be divided into three steps: initiation, growth and termination.

"Living free-radical polymerization" is also referred to as "controlled free-radical polymerization" and is known per se to the person skilled in the art in other contexts. The term comprehends chain growth processes in which essentially no chain termination reactions (transfer and termination) take place. Living free-radical polymerization thus proceeds essentially in the absence of irreversible transfer or termination reactions. These criteria can be fulfilled, for example, when the polymerization initiator is already used up at a very early stage during the polymerization and there is exchange between species of different reactivity that proceeds at least as rapidly as the chain propagation itself. The number of active chain ends especially remains essentially constant during the polymerization. This enables essentially simultaneous growth of the chains that continues over the entire polymerization process. This correspondingly results in a narrow molecular weight distribution or polydispersity.

In other words, controlled free-radical polymerization or living free-radical polymerization is particularly notable for reversible or even absent termination or transfer reactions. After the initiation, the active sites are accordingly conserved over the entire reaction. All polymer chains are formed (initiated) simultaneously and grow continuously over the entire time. The free-radical functionality of the active site is ideally conserved even after complete conversion of the monomers to be polymerized. This exceptional property of the controlled polymerizations enables preparation of well-defined structures such as gradient or block copolymers through sequential addition of different monomers.

By contrast, in conventional free-radical polymerization as described, for example, in EP 1 110 981 A2 (Kao), all three steps (initiation, growth and termination) proceed in parallel. The lifetime of each of the active, growing chains is very low and the monomer concentration during the chain growth of a chain remains essentially constant. The polymer chains thus formed do not have any active sites suitable for an addition of further monomers. Thus, this mechanism does not permit any control over the structure of the polymers. The preparation of gradient or block structures by means of conventional free-radical polymerization is therefore typically not possible (see, for example, "Polymere: Synthese, Synthese and Eigenschaften" [Polymers: Synthesis, Synthesis and Properties]; authors: Koltzenburg, Maskos, Nuyken; publisher: Springer Spektrum; ISBN: 97-3-642-34772-6 and "Fundamentals of Controlled/living Radical Polymerization"; publisher: Royal Society of Chemistry; editors: Tsarevsky, Sumerlin; ISBN: 978-1-84973-425-7).

Thus, there is a clear distinction of "living free-radical polymerization" from conventional "free-radical polymerization" or free polymerization conducted in a non-living or non-controlled manner.

The polymerization is preferably effected by reversible addition-fragmentation chain-transfer polymerization (RAFT), nitroxide-mediated polymerization (NMP) and/or atom transfer radical polymerization (ATRP).

In reversible addition-fragmentation chain-transfer polymerization, control over the polymerization is achieved by a reversible chain transfer reaction. Specifically, a growing free-radical chain adds on what is called a RAFT agent, which leads to formation of an intermediate free radical. The RAFT agent then fragments, in such a way as to reform another RAFT agent and a free radical available for propagation. In this way, the probability of propagation is distributed uniformly over all chains. The average chain length of the polymer formed is proportional to the RAFT agent concentration and to the reaction conversion. RAFT agents used are especially organic sulfur compounds. Particularly suitable are dithioesters, dithiocarbamates, trithiocarbonates and/or xanthates. The polymerization can be initiated in a conventional manner by means of initiators or thermal self-initiation.

In nitroxide-mediated polymerization, nitroxides react reversibly with the active chain end to form what is called a dormant species. The equilibrium between active and inactive chain ends is strongly to the side of the dormant species, which means that the concentration of active species is very low. The probability of two active chains meeting and terminating is thus minimized. An example of a suitable NMP agent is 2,2,6,6-tetramethylpiperidine N-oxide (TEMPO).

In atom transfer radical polymerization (ATRP), the concentration of free radicals is lowered by addition of a transition metal complex and a controlling agent (halogen-based) to such an extent that chain termination reactions, such as disproportionation or recombination, are very substantially suppressed.

In the present context, reversible addition-fragmentation chain-transfer polymerization (RAFT) has been found to be particularly preferable.

The initiator used for the polymerization is more preferably an azo compound and/or a peroxide as free-radical initiator, which is at least one representative selected from the group consisting of dibenzoyl peroxide (DBPO), di-tert-butyl peroxide, diacetyl peroxide, azobisisobutyronitrile (AIBN), α,α'-azodiisobutyramidine dihydrochloride (AAPH) and/or azobisisobutyramidine (AIBA).

If the polymerization is effected in an aqueous solution or in water, α,α'-azodiisobutyramidine dihydrochloride (AAPH) is advantageously used as initiator.

For control of the polymerization, in particular, one or more representatives from the group consisting of dithioesters, dithiocarbamates, trithiocarbonates and/or xanthates are used.

It has additionally been found to be advantageous when the polymerization is effected at least partly, preferably fully, in an aqueous solution.

More particularly, during the polymerization, a molar ratio of free ionizable monomers m1 to free side chain-bearing monomers m2 is at least temporarily altered.

Specifically, the alteration of the molar ratio includes a stepwise and/or continuous alteration. It is thus possible to form, in an efficiently controllable manner, a block structure and/or a concentration gradient or a gradient structure.

Optionally, during the polymerization, either a continuous change or a stepwise change in the molar ratio of the free ionizable monomers m1 to the free side chain-bearing monomers m2 is effected. This stepwise change is especially effected prior to conduction of the continuous change. In this way, for example, a copolymer comprise two or more sections having different structure is obtainable.

For formation of copolymers having block and/or gradient structures, the ionizable monomers m1 and the side chain-bearing monomers m2 are preferably at least partly added at different times.

In a further preferred embodiment, in the polymerization, in a first step a), a portion of the ionizable monomers m1 is converted or polymerized and, after attainment of a predetermined conversion, in a second step b), the as yet unconverted ionizable monomers m1 are polymerized together with the side chain-bearing monomers m2. Step a) is especially effected essentially in the absence of side chain-bearing monomers m2.

In this way, in a simple and inexpensive manner, a copolymer having a section consisting essentially of polymerized ionizable monomers m1 followed by a section having gradient structure is preparable.

In accordance with a very particularly preferred embodiment, in the polymerization, in a first step a), a portion of the side chain-bearing monomers m2 is converted or polymerized and, after attainment of a predetermined conversion, in a second step b), the as yet unconverted side chain-bearing monomers m2 are polymerized together with the ionizable monomers m1. Step a) is especially effected essentially in the absence of ionizable monomers m1.

In this way, for example, in a simple and inexpensive manner, a copolymer having a section consisting essentially of polymerized side chain-bearing monomers m2 followed by a section having gradient structure is preparable.

It is advantageous here to conduct steps a) and b) in immediate succession. In this way, it is possible to maintain the polymerization reaction in steps a) and b) to the best possible degree.

The polymerization in step a) is especially conducted until 0.1-100 mol %, especially 1-95 mol %, preferably 10-90 mol %, in particular 25-85 mol %, of the ionizable monomers m1 or of the side chain-bearing monomers m2 have been converted or polymerized.

The conversion of the monomers m1 and m2 or the progress of the polymerization can be monitored in a manner known per se, for example, with the aid of liquid chromatography, especially high-performance liquid chromatography (HPLC).

More particularly, the copolymer consists to an extent of at least 50 mol %, in particular at least 75 mol %, especially at least 90 mol % or 95 mol %, of polymerized ionizable monomers m1 and polymerized side chain-bearing monomers m2.

The copolymer may be prepared in liquid or solid form. More preferably, the copolymer is present as a constituent of a solution or dispersion, wherein a proportion of the copolymer is especially 10-90% by weight, preferably 25-65% by weight. This means that the copolymer can be added, for example, very efficiently to binder compositions. If the copolymer is being prepared in solution, especially in aqueous solution, it is additionally possible to dispense with further processing.

In accordance with another advantageous embodiment, a copolymer is prepared in the solid state of matter, especially in the form of a powder, in the form of pellets and/or sheets. This especially simplifies the transport of the copolymers. Solutions or dispersions of the copolymers can be converted to the solid state of matter, for example, by spray-drying.

According to the reaction regime, it is possible by the process of the invention to prepare polymers having a given or well-defined structure in a controlled manner. More particularly, for example, copolymers having block structure and/or copolymers having gradient structure are obtainable.

Preparation of Copolymers with Gradient Structure

The following procedure has been found to be particularly preferable for preparation of copolymers comprising a gradient structure: in a first step a), at least a portion of the side chain-bearing monomers m2 is reacted or polymerized and, after attainment of a predetermined conversion, in a second step b), the ionizable monomers m1 are polymerized together with as yet unconverted side chain-bearing monomers m2. Step a) is in particular effected in the absence of ionizable monomers m1.

It is also possible, in a first step a), to react or polymerize at least a portion of the ionizable monomers m1 and, after attainment of a predetermined conversion, in a second step b), to polymerize the side chain-bearing monomers M2, optionally together with any as yet unconverted ionizable monomers m1. Step a) is in particular effected in the absence of ionizable monomers m2.

More particularly, by the former process, it is possible in an efficient and inexpensive manner to prepare copolymers having a section consisting essentially of polymerized side chain-bearing monomers m2 followed by a section with gradient structure.

The polymerization in step a) is especially conducted until 1-74 mol %, preferably 10-70 mol %, in particular 25-70 mol %, especially 28-50 mol % or 30-45 mol %, of the side chain-bearing monomers m2 or of the ionizable monomers m1 have been converted or polymerized.

In a further advantageous embodiment, in step a) and/or in step b), there is at least one further polymerizable monomer ms of the formula XI as described above. The at least one further polymerizable monomer ms in this case is especially polymerized together with the monomer m1 and/or the monomer m2.

Alternatively, it is possible, in addition to step a) and step b), to provide a further step c) for polymerization of the at least one further polymerizable monomer ms. In this way, it is possible to prepare a copolymer having an additional section C. More particularly, step c) can be conducted between step a) and step b) in time. Thus, the additional section C is arranged between sections AA and AB in space.

Alternatively, it is possible to conduct step c) before or after steps a) and b). Thus, the additional section C may be arranged after section AA or before section AB.

Advantageous proportions, ratios and configurations of the monomers m1, m2, ms and of any further monomers correspond to the proportions, ratios and configurations already cited above, which have been described in connection with the monomer units M1, M2 and MS.

Preparation of a Copolymer with Block Structure

The following procedure has been found to be particularly preferable for preparation of copolymers comprising a block structure: in a first step a), at least a portion of the side chain-bearing monomers m2 is reacted or polymerized and, after attainment of a predetermined conversion, in a second step b), the ionizable monomers m1 are polymerized, optionally together with any as yet unconverted side chain-bearing monomers m2. Step a) is in particular effected in the absence of ionizable monomers m1.

The polymerization in step a) is especially conducted until 75-95 mol %, preferably 85-95 mol %, especially 86-92 mol %, of the originally charged monomers m2 have been converted/polymerized.

More particularly, the polymerization in step b) is especially conducted until 75-95 mol %, especially 80-92 mol %, of the originally charged monomers m1 have been converted/polymerized.

The sequence of steps a) and b) may, however, in principle also be switched.

Alternatively, it is possible, in addition to step a) and step b), to provide a further step c) for polymerization of the at least one further polymerizable monomer ms. In this way, it is possible to prepare a block copolymer having an additional block C. More particularly, step c) is conducted between step a) and step b) in time. Thus, the additional block C is arranged between the A and B blocks in space.

Advantageous proportions, ratios and configurations of the monomers m1, m2, ms and of any further monomers correspond to the proportions, ratios and configurations already cited above, which have been described in connection with the monomer units M1, M2 and MS.

Admixture

More preferably, the admixture comprises a superplasticizer in the form of a polymer P as described above and a copolymer as described above, especially having block or gradient structure. In particular, it is a block or gradient polymer having ionizable monomer units M1 of the formula VI and side chain-bearing monomer unit M2 of the formula VII.

The ionizable monomer units M1 of the copolymer preferably include acid groups, especially carboxylic acid, sulfonic acid, phosphoric acid and/or phosphonic acid groups. The side chain-bearing monomer unit M2 especially includes polyalkylene oxide side chains, especially polyethylene oxide and/or polypropylene oxide side chains.

Particular preference is given to an admixture comprising a superplasticizer in the form of a polymer P as described above, where $G^1$ and/or $G^2$ in the polymer P, in each case independently, are $-[A'O]_s-G^4$ with s=8-200, especially 20-70, and A' is a $C_2$- to $C_4$-alkylene;

r=0 and t=1 and a/b/c/d=(0.5-0.8)/(0.2-0.4)/(0-0.005)/0;

and where, at the same time, the copolymer has a gradient structure in at least one section AA and one, more than one or all the following features are fulfilled:

The copolymer consists to an extent of at least 75 mol %, especially at least 90 mol % or 95 mol %, of ionizable monomer units M1 and side chain-bearing monomer units M2;

The copolymer comprises or consists of at least one section AA and a further section AB;

The further section AB comprises side chain-bearing monomer units M2, especially at least 50 mol %, preferably at least 75 mol %, in particular at least 90 mol % or at least 95 mol %, based on all the monomer units present in the section AB. Any proportion of ionizable monomer units M1 present in the further section AB is less than 25 mol %, especially less than 10 mol % or less than 5 mol %, based on all the monomer units M2 in the further section AB.

A molar ratio of the monomer units M1 to the monomer units M2 in the copolymer is in the range of 0.5-6, preferably 0.8-3.5;

$R^1$ is COOM;

$R^2$ and $R^5$ are H or $CH_3$, preferably $CH_3$;

$R^3$=$R^4$=$R^6$=$R^7$=H;

m=0 and p=1;

X=—O—

A=$C_2$-alkylene and n=10-150, preferably 15-50;

$R^a$=H or —$CH_3$, preferably $CH_3$.

Very particular preference is likewise given to an admixture comprising a superplasticizer in the form of a polymer P as described above, where $G^1$ and/or $G^2$ in the polymer P, in each case independently, are $-[A'O]_s-G^4$ with s=8-200, especially 20-70, and A' is a $C_2$- to $C_4$-alkylene;

r=0 and t=1 and a/b/c/d=(0.5-0.8)/(0.2-0.4)/(0-0.005)/0;

and where, at the same time, the copolymer is a block copolymer and comprises at least one first block A and at least one second block B, where the first block A has an ionizable monomer unit M1 of the formula VI and the second block B has a side chain-bearing monomer unit M2 of the formula VII and any proportion of monomer units M2 present in the first block A is less than 25 mol %, especially not more than 10 mol %, based on all the monomer units M1 in the first block A and where any proportion of monomer units M1 present in the second block B is less than 25 mol %, especially not more than 10 mol %, based on all the monomer units M2 in the second block B, and where at least one, more than one or all the following features are fulfilled:

block A has 7-40, especially 10-25, monomer units M1 and block B has 7-50, especially 20-40, monomer units M2.

The first block A consists, based on all the monomer units in the first block A, to an extent of at least 75 mol %, preferably at least 90 mol %, of ionizable monomer units M1 of the formula VI;

The second block B consists, based on all the monomer units in the second block B, to an extent of at least 75 mol %, preferably at least 90 mol %, of side chain-bearing monomer units M2 of the formula VII;

A molar ratio of the monomer units M1 to the monomer units M2 in the block copolymer is in the range of 0.5-6, preferably 0.8-3.5;

$R^1$ is COOM;

$R^2$ and $R^5$ are H or $CH_3$, preferably $CH_3$;

$R^3$=$R^4$=$R^6$=$R^7$=H;

m=0 and p=1;

X=—O—

A=$C_2$-alkylene and n=10-150, preferably 15-50;

$R^a$=H or —$CH_3$, preferably $CH_3$.

The weight ratio of superplasticizer to copolymer in the admixture is particularly 99:1-10:90, preferably 90:10-20:80, especially 80:20-50:50.

More particularly, the proportion by weight of the superplasticizer in the admixture is greater than the proportion by weight of the copolymer.

In the admixture of the invention, a proportion of the superplasticizer is especially 10-99% by weight, preferably 40-90% by weight, in particular 50-80% by weight, based on the total weight of the admixture.

The proportion of the copolymer in the admixture is in particular 1-90% by weight, 10-60% by weight, especially 20-50% by weight, based on the total weight of the admixture.

With ratios of this kind, the advantages of the invention are manifested to a particular degree.

The admixture may be produced in liquid or solid form. More preferably, the admixture is in the form of a solution or dispersion, where a proportion of the copolymer and the superplasticizer together is especially 10-90% by weight, preferably 25-65% by weight. In this way, the copolymer can be added very efficiently, for example, to binder compositions.

In accordance with another advantageous embodiment, the admixture is produced in the solid state of matter, especially in the form of a powder or in the form of pellets and/or sheets. This especially simplifies the transport of the admixture. Solutions or dispersions of the admixture can be converted to the solid state of matter, for example by spray-drying. It is also possible, for example, to mix superplasticizers in the solid state of matter, for example in the form of a powder, and copolymers in the solid state of matter, for example likewise in the form of powder, with one another.

Uses of the Admixture

In addition, the present invention relates to the use of an admixture as described above as dispersant for solid particles.

The term "solid particles" here represents particles of inorganic and/or organic materials. In particular, they are inorganic and/or mineral particles.

Particularly advantageously, the admixture is used as dispersant for mineral binder compositions. The admixture can especially be used for liquefaction, for water reduction and/or for improving the workability of a mineral binder composition.

More particularly, the admixture can be used to prolong the workability of a mineral binder composition.

The present invention additionally further relates to a mineral binder composition comprising at least one admixture as described above.

The mineral binder composition comprises at least one mineral binder. The expression "mineral binder" is especially understood to mean a binder which reacts in the presence of water in a hydration reaction to give solid hydrates or hydrate phases. This may, for example, be a hydraulic binder (e.g. cement or hydraulic lime), a latently hydraulic binder (e.g. slag), a pozzolanic binder (e.g. fly ash) or a nonhydraulic binder (gypsum or white lime).

More particularly, the mineral binder or the binder composition comprises a hydraulic binder, preferably cement. Particular preference is given to a cement having a cement clinker fraction of ≥35% by weight. More particularly, the cement is of the CEM I, CEM II, CEM III, CEM IV or CEM V type (according to standard EN 197-1). A proportion of the hydraulic binder in the overall mineral binder is advantageously at least 5% by weight, particularly at least 20% by weight, preferably at least 35% by weight, especially at least 65% by weight. In a further advantageous embodiment, the mineral binder consists to an extent of ≥95% by weight of hydraulic binder, especially of cement or cement clinker.

It may alternatively be advantageous when the mineral binder or the mineral binder composition comprises or consists of other binders. These are especially latently hydraulic binders and/or pozzolanic binders. Suitable latently hydraulic and/or pozzolanic binders are, for example, slag, fly ash and/or silica dust. The binder composition may likewise comprise inert substances, for example limestone, quartz flours and/or pigments. In an advantageous embodiment, the mineral binder contains 5-95% by weight, especially 5-65% by weight, more preferably 15-35% by weight, of latently hydraulic and/or pozzolanic binders. Advantageous latently hydraulic and/or pozzolanic binders are slag and/or fly ash.

In a particularly preferred embodiment, the mineral binder comprises a hydraulic binder, especially cement or cement clinker, and a latently hydraulic and/or pozzolanic binder, preferably slag and/or fly ash. The proportion of latently hydraulic and/or pozzolanic binder is more preferably 5-65% by weight, more preferably 15-35% by weight, while at least 35% by weight, especially at least 65% by weight, of the hydraulic binder is present.

The mineral binder composition is preferably a mortar or concrete composition.

The mineral binder composition is especially a workable mineral binder composition and/or one that has been made up with water.

A weight ratio of water to binder in the mineral binder composition is preferably in the range of 0.25-0.7, particularly 0.26-0.65, preferably 0.27-0.60, especially 0.28-0.55.

The admixture is advantageously used with a proportion of 0.01-10% by weight, especially 0.1-7% by weight or 0.2-5% by weight, based on the binder content. The proportion of the admixture is based here on the total weight of the admixture.

An additional aspect of the present invention relates to a shaped body, especially a constituent of a built structure, obtainable by curing a mineral binder composition comprising an admixture as described above after addition of water. A built structure may, for example, be a bridge, a building, a tunnel, a roadway or a runway.

Further advantageous embodiments of the invention will be apparent from the working examples which follow.

BRIEF DESCRIPTION OF THE DRAWING

The figures used to elucidate the working examples show.

WORKING EXAMPLES

1. Preparation Examples 1.1 Superplasticizers

Figure 1:
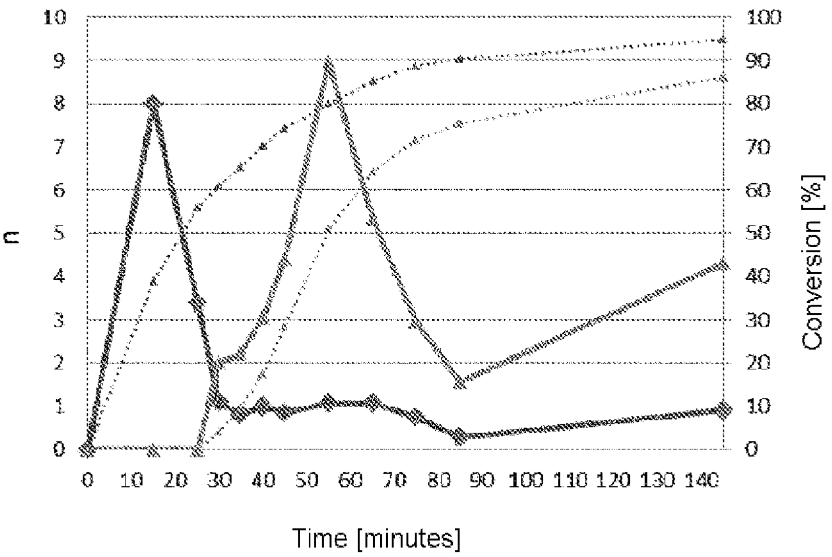
FIG. 1: The plot of the monomer conversions against time in the preparation of a copolymer of the invention (CP3)

For the experiments which follow, a superplasticizer in the form of a polymer P was prepared in a known manner per se by polymer-analogous reaction of polyacrylic acid ($M_W$=4'500 g/mol) with alcohols of the HO—$R^1$ type and amines of the $H_2N$—$R^2$ type (conversion level greater than 97%). The raw materials used for this purpose are commercially available from various suppliers. The structure of the polymer thus prepared corresponds to the previously described polymer P having the substructure units S1, S2 and S3, where:

$R^u$ and $R^v$ are hydrogen;

r=0 and t=1;

$G^1$ is a mixture of a methoxy-terminated polyethylene glycol with mass $M_n$=1000 g/mol (PEG1000-$OCH_3$) and a methoxy-terminated polyethylene glycol with mass $M_n$=3000 g/mol (PEG3000-$OCH_3$). The molar ratio of PEG1000-$OCH_3$ to PEG3000-$OCH_3$ here is 0.205/0.153.

$G^2$ is a methoxy-terminated ethylene oxide/propylene oxide copolymer with mass $M_n$=2000 g/mol, where the ethylene oxide and propylene oxide units are present in a molar ratio of 50:50;

a/b/c/d=0.640/0.205/0.153/0.002/0, and the molecular weight of the comb polymer ($M_W$) is about 60'000 g/mol.

A solution containing 40% by weight of the comb polymer in water was obtained, which is referred to hereinafter as FM.

Polymers of this kind are also available commercially from Sika Schweiz AG under the Viscocrete® name.

1.2 Copolymer CP1

For preparation of a block copolymer by means of RAFT polymerization, a round-bottom flask equipped with a reflux condenser, stirrer system, thermometer and a gas inlet tube is initially charged with 57.4 g of 50% methoxy polyethylene glycol 1000 methacrylate (0.03 mol) and 22 g of deionized water. The reaction mixture is heated to 80° C. with vigorous stirring. A gentle inert N2 gas stream is passed through the solution during the heating and over all the remaining reaction time. 378 mg of 4-cyano-4-(thiobenzoyl) pentanoic acid (1.35 mmol) are then added to the mixture. Once the substance has fully dissolved, 67 mg of AIBN (0.41 mmol) are added. From then on, the conversion is determined regularly by means of HPLC.

As soon as the conversion, based on methoxy polyethylene glycol methacrylate, is 90%, 4.66 g of methacrylic acid (0.05 mol) are added. The mixture left to react for a further 4 h and then to cool. What remains is a clear, reddish, aqueous solution having a solids content of around 40%.

The copolymer thus obtained is referred to as polymer CP1 and, owing to the virtually complete conversion of the methoxy polyethylene glycol methacrylate (90 mol %), has a block structure in which the side chain-bearing monomer units (methoxy polyethylene glycol methacrylate) are present in a first block and the ionizable monomer units (methacrylic acid) essentially spatially separately in a second block.

1.3 Copolymer CP2

For preparation of a copolymer by means of RAFT polymerization, a round-bottom flask equipped with a reflux condenser, stirrer system, thermometer and a gas inlet tube is initially charged with 57.4 g of 50% methoxy polyethylene glycol 1000 methacrylate (0.03 mol) and 22 g of deionized water. The reaction mixture is heated to 80° C. with vigorous stirring. A gentle N2 inert gas stream is passed through the solution during the heating and over all the remaining reaction time. 756 mg of 4-cyano-4-(thiobenzoyl) pentanoic acid (2.7 mmol) are then added to the mixture. Once the substance has fully dissolved, 135 mg of AIBN (0.8 mmol) are added. From then on, the conversion is determined regularly by means of HPLC.

As soon as the conversion, based on methoxy polyethylene glycol methacrylate, is 90%, 6.99 g of methacrylic acid (0.08 mol) are added to the reaction mixture. The mixture left to react for a further 4 h and then to cool. What remains is a clear, reddish, aqueous solution having a solids content of around 40%. The copolymer thus obtained is referred to as polymer CP2.

1.4 Copolymer CP3

For preparation of a gradient polymer by means of RAFT polymerization, a round-bottom flask equipped with a reflux condenser, stirrer system, thermometer and a gas inlet tube is initially charged with 57.4 g of 50% methoxy polyethylene glycol 1000 methacrylate (0.03 mol) and 22 g of deionized water. The reaction mixture is heated to 80° C. with vigorous stirring. A gentle N2 inert gas stream is passed through the solution during the heating and over all the remaining reaction time. 378 mg of 4-cyano-4-(thiobenzoyl) pentanoic acid (1.35 mmol) are then added to the mixture. Once the substance has fully dissolved, 67 mg of AIBN (0.41 mmol) are added. From then on, the conversion is determined regularly by means of HPLC.

As soon as the conversion, based on methoxy polyethylene glycol methacrylate, is 65 mol %, 4.66 g of methacrylic acid (0.05 mol) dissolved in 20 g of $H_2O$ are added dropwise within 20 min. After this has ended, the mixture is left to react for a further 4 h and then to cool. What remains is a clear, pale reddish, aqueous solution having a solids content of around 35%. The copolymer with gradient structure thus obtained is referred to as copolymer CP3.

FIG. 1 shows the plot of the monomer conversions against time in the preparation of the copolymer CP3. The monomer conversions were determined in a manner known per se at the times given in FIG. 1 during the preparation of the copolymer by high-performance liquid chromatography (HPLC). The upper dotted curve which begins at the origin at time t=0 minutes represents the percentage conversion of the methoxy polyethylene glycol methacrylate monomers (=side chain-bearing monomers m2) (scale to the right). The lower dotted curve which begins at time t=25 minutes represents the percentage conversion of the methacrylic acid monomers (=ionizable monomers m1) (scale to the right). The solid line with the diamond-shaped points indicates the number of side chain-bearing monomers m2 which have been polymerized since the preceding measurement point (=n(M2); left-hand scale). Correspondingly, the solid line with the triangular points indicates the number of ionizable monomers m1 which have been polymerized since the preceding measurement point (=n(M1); left-hand scale).

Using the data in FIG. 1 for the period from 0 to 55 minutes at the particular time to calculate the ratio n(M2)/[n(M1)+n(M2)] and n(M1)/[n(M1)+n(M2)], the following values are found:

TABLE 1

Monomer ratios during the preparation of the copolymer CP3.

| Time | n(M2)/[n(M1) + n(M2)] | n(M1)/[n(M1) + n(M2)] |
|---|---|---|
| 15 | 100% | 0% |
| 25 | 100% | 0% |
| 30 | 33% | 67% |
| 35 | 29% | 71% |
| 40 | 25% | 75% |
| 45 | 17% | 83% |
| 55 | 10% | 90% |

It is apparent from table 1 that, in the preparation of the copolymer CP3, during the first 25 minutes, a section consisting of 100% side chain-bearing monomer units M2 is formed, followed by a section in which the proportion of side chain-bearing monomer units M2 decreases continuously while the proportion of ionizable monomer units M1 increases continuously.

Figure 2:
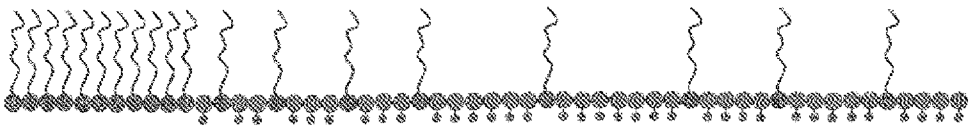
FIG. 2: A schematic diagram of a possible structure of a copolymer which can be derived from the conversions according to FIG. 1.

FIG. 2 additionally shows a schematic of a possible structure of the copolymer CP3. This can be inferred directly from the conversions shown in FIG. 1. The side chain-bearing monomer units M2 (=polymerized methoxy polyethylene glycol methacrylate monomers) are represented as a circle with a twisted appendage. The ionizable monomer units M1 are represented as dumbbell-shaped symbols.

It is apparent from FIG. 2 that copolymer CP3 comprises a first section AA with gradient structure and a further section AB consisting essentially of side chain-bearing monomer units.

2. Admixtures

Various admixtures were produced by mixing the above-described superplasticizer FM and the copolymers CP1 and CP2. Table 2 gives an overview of the compositions of the admixtures produced.

TABLE 2

| Compositions of the admixtures produced | | |
|---|---|---|
| Admixture | Proportion of FM | Copolymer/proportion |
| ZZ1 | 50% by weight | CP2/50% by weight |
| ZZ2 | 70% by weight | CP2/30% by weight |
| ZR1 | 100% by weight | — |
| ZR2 | — | CP2/100% by weight |

The superplasticizers and copolymers prepared according to the above preparation examples were used directly for production of the admixtures without further processing. Correspondingly, the admixtures are aqueous solutions or dispersions.

3. Cement Pastes 3.1 Production

The cement pastes used for test purposes are based on cement (CEM I 42.5 N; Normo 4; available from Holcim Schweiz) and water.

To make up a cement paste, the cement was dry-mixed in a Hobart mixer for 1 minute. Within 30 seconds, the make-up water (ratio of water to cement w/c=0.305), into which the respective admixture composition (proportion: 0.75% by weight; based on cement content) had been mixed beforehand, was added and the mixture was mixed for a further 2.5 minutes. The total mixing time in wet form was 3 minutes in each case.

3.2 Cement Paste Tests

To determine the dispersancy of the admixture compositions, the slump (ABM) of each made-up cement paste was measured at different times. The slump (ABM) of the cement pastes was determined in accordance with EN 1015-3.

3.3 Results of the Cement Paste Tests

Table 3 gives an overview of the cement paste tests conducted and the results achieved. Experiment V1 is a blank experiment conducted for comparative purposes without addition of a polymer.

TABLE 3

| Results of cement paste tests | | | | | | | | |
|---|---|---|---|---|---|---|---|---|
| | | ABM# [mm] after | | | | | | |
| No. | Admixture | 0 min | 30 min | 123 min | 180 min | 240 min | 300 min | 341 min |
| V1 | — | <120 | n.m. | n.m. | n.m. | n.m. | n.m. | n.m. |
| V2 | ZR1 | 135 | 108 | 110 | 110 | 105 | 72 | n.m. |
| V3 | ZR2 | 180 | 119 | 110 | 101 | 90 | 68 | n.m. |
| V4 | ZZ1 | 162 | 134 | 135 | 129 | 125 | 119 | 111 |
| V5 | ZZ2 | 163 | 117 | 120 | 118 | 114 | 106 | 97 |

n.m. = not measureable

#slump according to EN 1015-3. The time "0 min" corresponds to the first measurement immediately after the cement paste has been made up.

The experiments show that the admixtures of the invention (experiments V4 and V5) by comparison with a pure superplasticizer (experiment V2) or pure copolymer CP2 (experiment V3), with the same dosage, give rise not just to elevated slump but also to distinctly longer working times. The results demonstrate the functional and synergistic interaction between superplasticizer and copolymer in the admixtures of the invention.

However, the above-described embodiments should be regarded merely as illustrative examples which can be modified as desired within the scope of the invention.

The invention claimed is:

1. An admixture comprising:

a) a superplasticizer and b) a copolymer having a polymer backbone and side chains bonded thereto, the copolymer comprising:

at least one ionizable monomer unit M1 and at least one side chain-bearing monomer unit M2, wherein:

the copolymer has a nonrandom distribution of the monomer units M1 and/or the monomer units M2 in a direction along the polymer backbone, the superplasticizer and the copolymer differ from a chemical and/or structural point of view, and the superplasticizer comprises the following substructure units:

a) a molar parts of a substructure unit S1 of formula I (I)

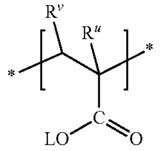

b) b molar parts of a substructure unit S2 of formula II (II)

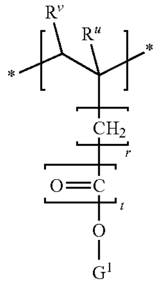

c) c molar parts of a substructure unit S3 of formula (III)

(III)

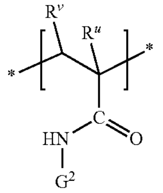

d) d molar parts of a substructure unit S4 of formula (IV)

(IV)

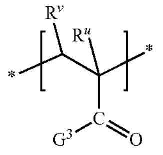

where:

L independently represents $H^+$, an alkali metal ion, an alkaline earth metal ion, a di- or trivalent metal ion, an ammonium ion or an organic ammonium group, each $R^u$ independently of any other is hydrogen or a methyl group, each $R^v$ independently of any other is hydrogen or —COOM, r=0, 1, or 2, t=0 or 1, $G^1$ and $G^2$ are each independently a $C_1$- to $C_{20}$-alkyl group, -cycloalkyl group, -alkylaryl group, or $-[A'O]_s-G^4$, where $A'=C_2$- to $C_4$-alkylene, $G^4$ is H, a $C_1$- to $C_{20}$-alkyl group, -cycloalkyl group, or -alkylaryl group, and s=2-250, $G^3$ is independently —$NH_2$, —$NG^5G^6$, or —$OG^7NG^8G^9$, where:

$G^5$ and $G^6$ are each independently a $C_1$- to $C_{20}$-alkyl group, -cycloalkyl group, -alkylaryl group, or -aryl group, or are a hydroxyalkyl group, an acetoxyethyl group ($CH_3$—CO—O—$CH_2$—$CH_2$—), a hydroxyisopropyl group (HO—$CH(CH_3)$—$CH_2$), or an acetoxyisopropyl group ($CH_3$—CO—O—CH($CH_3$)—$CH_2$—); or $G^5$ and $G^6$ together form a ring, which includes the nitrogen, in order to form a morpholine or imidazoline ring;

$G^7$ is a $C_2$-$C_4$-alkylene group, $G^8$ and $G^9$ each independently represents a $C_1$- to $C_{20}$-alkyl group, -cycloalkyl group, -alkylaryl group, -aryl group, or a hydroxyalkyl group, and a, b, c and d represent molar proportions of the respective substructure units S1, S2, S3 and S4, a/b/c/d=(0.1-0.9)/(0.1-0.9)/(0-0.8)/(0-0.8), and with the proviso that a+b+c+d=1.

2. An admixture comprising:

a) a superplasticizer and b) a copolymer having a polymer backbone and side chains bonded thereto, the copolymer comprising:

at least one ionizable monomer unit M1 and at least one side chain-bearing monomer unit M2, wherein:

the copolymer has a nonrandom distribution of the monomer units M1 and/or the monomer units M2 in a direction along the polymer backbone, the copolymer is a block copolymer, wherein the ionizable monomer units M1 are present essentially in at least one first block A and the side chain-bearing monomer units M2 essentially in at least one second block B, and the superplasticizer and the copolymer differ from a chemical and/or structural point of view.

3. An admixture comprising:

a) a superplasticizer and b) a copolymer having a polymer backbone and side chains bonded thereto, the copolymer comprising:

at least one ionizable monomer unit M1 and at least one side chain-bearing monomer unit M2, wherein:

the copolymer has a nonrandom distribution of the monomer units M1 and/or the monomer units M2 in a direction along the polymer backbone, the copolymer has a gradient structure in at least one section AA in a direction along the polymer backbone with respect to the ionizable monomer unit M1 and/or with respect to the side chain-bearing monomer unit M2, and the superplasticizer and the copolymer differ from a chemical and/or structural point of view.

4. The admixture as claimed in claim 2, wherein the ionizable monomer unit M1 in the copolymer has a structure of formula VI (VI)

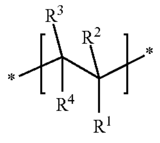

and the side chain-bearing monomer unit M2 includes a structure of formula VII (VII)

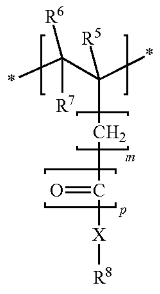

where:

$R^1$, in each case independently, is —COOM, —$SO_2$—OM, —O—$PO(OM)_2$, or —$PO(OM)_2$, $R^2$, $R^3$, $R^5$ and $R^6$, in each case independently, are H or an alkyl group having 1 to 5 carbon atoms, $R^4$ and $R^7$, in each case independently, are H, —COOM, or an alkyl group having 1 to 5 carbon atoms, or $R^1$ forms a ring together with $R^4$ to give —CO—O—CO—, M, independently of one another, represents $H^+$, an alkali metal ion, an alkaline earth metal ion, a di- or trivalent metal ion, an ammonium ion or an organic ammonium group;

m=0, 1 or 2, p=0 or 1,

X, in each case independently, is —O— or —NH—, $R^8$ is a group of formula $-[AO]_n-R^a$, where $A=C_2$- to $C_4$-alkylene, $R^a$ is H, a $C_1$- to $C_{20}$-alkyl group, -cycloalkyl group, or -alkylaryl group, and n=2-250.

5. The admixture as claimed in claim 2, wherein the copolymer comprises at least one further monomer unit MS of formula VIII:

(VIII)

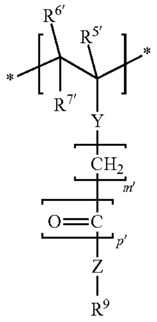

where:

$R^{5'}$, $R^{6'}$, $R^{7'}$, m' and p' are as defined for $R^5$, $R^6$, $R^7$, m and p as in claim 4;

Y, in each case independently, is a chemical bond or —O—;

Z, in each case independently, is a chemical bond, —O— or —NH—; and $R^9$, in each case independently, is an alkyl group, cycloalkyl group, alkylaryl group, aryl group, hydroxyalkyl group, or acetoxyalkyl group, each having 1-20 carbon atoms.

6. The admixture as claimed in claim 3, wherein the copolymer, in addition to the at least one section AA having a gradient structure, has a further section AB, wherein there is essentially a constant local concentration of the monomers and/or a random distribution of the monomers over the entire section AB.

7. The admixture as claimed in claim 1, wherein a polydispersity of the copolymer is <1.5.

8. The admixture as claimed in claim 1, wherein a molar ratio of the monomer units M1 to the monomer units M2 in the copolymer is in the range of 0.5-6.

9. The admixture as claimed in claim 4, wherein:

$R^1$=COOM;

$R^2$ and $R^5$, independently of one another, are H, —$CH_3$, or mixtures thereof;

$R^3$ and $R^6$, independently of one another, are H or —$CH_3$, $R^4$ and $R^7$, independently of one another, are H or —COOM; and X in at least 75 mol %, of all monomer units M2 is —O—.

10. A method for dispersing solid particles, comprising mixing an admixture as claimed in claim 1 with solid particles.

11. A mineral binder composition, comprising at least one admixture as claimed in claim 1.

12. A shaped body, obtained by curing a mineral binder composition as claimed in claim 11 after addition of water.

13. The admixture as claimed in claim 3, wherein the ionizable monomer unit M1 in the copolymer has a structure of formula VI (VI)

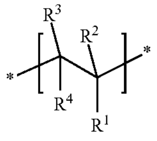

and the side chain-bearing monomer unit M2 includes a structure of formula VII (VII)

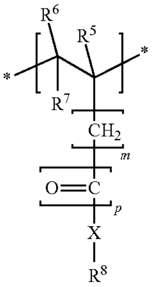

where:

$R^1$, in each case independently, is —COOM, —$SO_2$—OM, —O—$PO(OM)_2$, or —$PO(OM)_2$, $R^2$, $R^3$, $R^5$ and $R^6$, in each case independently, are H or an alkyl group having 1 to 5 carbon atoms, $R^4$ and $R^7$, in each case independently, are H, —COOM, or an alkyl group having 1 to 5 carbon atoms, or $R^1$ forms a ring together with $R^4$ to give —CO—O—CO—, M, independently of one another, represents $H^+$, an alkali metal ion, an alkaline earth metal ion, a di- or trivalent metal ion, an ammonium ion or an organic ammonium group;

m=0, 1 or 2, p=0 or 1,

X, in each case independently, is —O— or —NH—, $R^8$ is a group of formula $-[AO]_n-R^a$, where A=$C_2$- to $C_4$-alkylene, $R^a$ is H, a $C_1$- to $C_{20}$-alkyl group, -cycloalkyl group, or -alkylaryl group, and n=2-250.

14. The admixture as claimed in claim 3, wherein the copolymer comprises at least one further monomer unit MS of formula VIII:

(VIII)

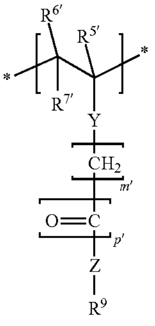

where:

$R^{5'}$, $R^{6'}$, $R^{7'}$, m' and p' are as defined for $R^5$, $R^6$, $R^7$, m and p as in claim 4;

Y, in each case independently, is a chemical bond or —O—;

Z, in each case independently, is a chemical bond, —O— or —NH—; and $R^9$, in each case independently, is an alkyl group, cycloalkyl group, alkylaryl group, aryl group, hydroxyalkyl group, or acetoxyalkyl group, each having 1-20 carbon atoms.

15. The admixture as claimed in claim 13, wherein:

$R^1$=COOM;

$R^2$ and $R^5$, independently of one another, are H, —$CH_3$, or mixtures thereof;

$R^3$ and $R^6$, independently of one another, are H or —$CH_3$, $R^4$ and $R^7$, independently of one another, are H or —COOM; and X in at least 75 mol %, of all monomer units M2 is —O—.

16. A method for dispersing solid particles, comprising mixing an admixture as claimed in claim 2 with solid particles.

17. A method for dispersing solid particles, comprising mixing an admixture as claimed in claim 3 with solid particles.

18. A mineral binder composition, comprising at least one admixture as claimed in claim 2.

19. A mineral binder composition, comprising at least one admixture as claimed in claim 3.

20. A shaped body, obtained by curing a mineral binder composition as claimed in claim 19 after addition of water.

* * * * *